(12) United States Patent
Morong

(10) Patent No.: US 8,319,089 B2
(45) Date of Patent: Nov. 27, 2012

(54) OSCILLATORY, MAGNETICALLY ACTIVATED POSITION SENSOR

(76) Inventor: William Henry Morong, Paoli, PA (US)

( * ) Notice: Subject to any disclaimer, the term of this patent is extended or adjusted under 35 U.S.C. 154(b) by 0 days.

(21) Appl. No.: 13/136,369

(22) Filed: Jul. 29, 2011

(65) Prior Publication Data

US 2012/0055320 A1    Mar. 8, 2012

Related U.S. Application Data

(60) Provisional application No. 61/402,921, filed on Sep. 7, 2010.

(51) Int. Cl.
*G10H 1/32* (2006.01)
*G10H 3/00* (2006.01)

(52) U.S. Cl. ........................................................ 84/746

(58) Field of Classification Search .............. 84/744–746
See application file for complete search history.

(56) References Cited

U.S. PATENT DOCUMENTS

| | | | |
|---|---|---|---|
| 3,688,290 A | 8/1972 | Beer | |
| 5,107,262 A * | 4/1992 | Cadoz et al. | 341/22 |
| 2001/0052771 A1 | 12/2001 | Jagiella | |
| 2003/0183066 A1 * | 10/2003 | Gallitzendorfer | 84/745 |
| 2005/0188810 A1 | 9/2005 | Meisel | |
| 2011/0132182 A1 * | 6/2011 | Kikumoto | 84/744 |

FOREIGN PATENT DOCUMENTS

| | | |
|---|---|---|
| CA | 1275361 | 10/1990 |
| GB | 1152257 | 5/1969 |

* cited by examiner

*Primary Examiner* — Jeffrey Donels

(57) ABSTRACT

This invention provides an oscillatory, magnetically-activated position sensor. Magnetic flux linkages between a magnet and an inductor having a magnetic core modulate the core permeability, and thus inductance, responsive to mechanical position. An electronic oscillator comprises the inductor as part of a tank circuit. The amplitude and frequency of the oscillator is therefore responsive to mechanical position. Circuitry for generating a sensor output signal responsive to oscillator amplitude, and thus to mechanical position is provided. Matrix operation of sensors is taught.

A key position sensor for a musical instrument clavier is taught. A clavier key comprising plural inventive sensors invention is taught. A touch adjusting mechanism for a clavier key comprising inventive sensors is provided. A clavier piston comprising a sensor according to this invention is provided. A stop action magnet comprising a sensor according to this invention is provided.

10 Claims, 8 Drawing Sheets

OSCILLATORY, MAGNETICALLY ACTIVATED POSITION SENSOR

CROSS-REFERENCE TO RELATED APPLICATIONS

The present application claims the benefit of U.S. Provisional Application No. 61/402,921, filed on Sep. 7, 2010, which is incorporated by reference.

STATEMENT REGARDING FEDERALLY SPONSORED RESEARCH OR DEVELOPMENT

The present invention was not developed with the use of any Federal Funds, but was developed independently by the inventor.

BACKGROUND OF THE INVENTION

The keyboard, or clavier, has for centuries been an input device for musical instruments. Until the late 19th century, keyboard instruments actions were purely mechanical, as they remain today in most pianos and in tracker organs. In the late 19th and early 20th centuries, pneumatics were applied to organ actions. Shortly thereafter, electro-mechanical actions were applied to organs, and are still often employed, either alone, or combined with pneumatic devices. After the first quarter of the 20th century, electrical and electronic organs were developed, which are controlled by electrical switches.

Electrical contact key switches are subject to unreliable operation, due largely to corrosion, dirt, and metal-fatigue. One may still purchase key contact blocks for early electropneumatic organs comprising several resilient wires embedded in a wooden block. Despite contact redundancy such malfunctions as dead notes and "ciphers" (notes stuck on) are common with such switches, and sometimes disrupt organ concerts.

Numerous and varied non-contact electrical keyboard switches have been devised. In U.S. Pat. No. 2,873,637, Herold teaches a capacitive touch control keyboard, as do Jones in U.S. Pat. No. 3,507,970, Cockerell in U.S. Pat. No. 3,836,909, Nagai et al. In U.S. Pat. No. 3,943,812, and Moog in U.S. Pat. No. 4,213,367. Potzl teaches a gas-discharge device in U.S. Pat. No. 3,002,411. In U.S. Pat. No. 3,248,470, Markowitz et al. Teach detection by voltage induced into a coil by a moving magnet, as do Ohno in U.S. Pat. No. 3,708,605, Yamamoto et al. In U.S. Pat. No. 4,524,669 and Muramatsu in U.S. Pat. No. 5,107,748. In U.S. Pat. No. 3,313,877, Boenning teaches using a linear variable displacement transformer (LVDT) as a key input detector. In U.S. Pat. No. 3,255,293, Walker teaches the use of a saturable transformer for key detection, as does Michel in U.S. Pat. No. 3,353,030. In U.S. Pat. No. 3,590,134, Ogi teaches the use of a magnet and magneto-resistor as a key detector, as does Ohno in U.S. Pat. Nos. 3,594,488 and 3,617,600. Jones, in U.S. Pat. No. 3,594,487, teaches moving a metal object to modify the coupling of a transformer as a key detector, as does Kishi in U.S. Pat. No. 3,805,185. Klann, in U.S. Pat. No. 4,151,174, teaches the use of a reed switch, a hermetically-sealed magnetically-operated electrical contact, in an organ pedal board. In U.S. Pat. No. 4,362,934, McLey teaches the use of an opto-electric device as a key detector, as do Tamaki in U.S. Pat. No. 4,974,482, Miller in U.S. Pat. No. 5,237,123, Vandervoort in U.S. Pat. No. 5,505,115, and Kimble in U.S. Pat. No. 5,567,902. In U.S. Pat. No. 4,366,463, Barker teaches the use of a Hall-effect device and a magnet as a key detector, as does Lee in U.S. Pat. Nos. 6,384,305 and 6,472,589. In U.S. Pat. No. 4,425,511, Brosh teaches a key detector based on geometric change modifying transformer coupling. In U.S. Pat. No. 4,838,139, Fiori uses a movable metal spoiler to alter the inductance of a coil to change the resonant frequency of an LC tank circuit as a key detector, as does Muramatsu in U.S. Pat. No. 5,187,315. The use of a piezoelectric element as a key detector is taught by Fields in U.S. Pat. No. 5,237,125.

The plethora of largely non-contact key switches cited above underlines the basic problem that electrical-contact switches may be effective and reliable in heavy-duty applications where sufficient voltage or sufficient mechanical force may be applied to effect adequate contact, but are problematic for delicate switching tasks. Most non-contact switches rely upon a field or a wave that can generate a detectable electrical effect. The electrostatic field underlying capacitance detectors incurs a fundamental limitation. Materials of a wide variety of dielectric constants and conductivities that interact with electrostatic fields are ubiquitous. Electro-optical devices are more controllable, but their widespread use has only recently become practical. Since most common materials are not significantly magnetically permeable, magnetically operated switches have historically been the most controllable type. Therefore, magnetically controlled switches dominate the devices cited above.

Magnetically operated switches have been employed for data entry key switches, for proximity detectors, and in electrically operated security and munitions systems. In U.S. Pat. No. 3,531,792, Bagno et al. Teach an "alarm system using saturable contacts." In U.S. Pat. No. 3,921,530 Burkhardt et al. Teach a similar method fitted to a trip wire for intrusion detection and activating munitions. In U.S. Pat. Nos. 3,612,241, 3,368,221, 3,368,222, 3,698,531, and 4,099,176 Bernin et al. Teach a variety of magnetically operated key-switches, as do Madland et al. in U.S. Pat. Nos. 3,714,611 and 4,028,696, Wnantowicz in U.S. Pat. No. 4,017,850, and Sidor in U.S. Pat. No. 4,137,512. These magnetically operated contact-less devices may be classified as flux-gate switches which depend on the saturation or de-saturation of the core of an inductor, or of a transformer, to change the inductive reactance, or the coupling, respectively, of the same. All require a AC source of excitation to be applied to the inductor and detection circuitry to sense the inductive or coupling change caused by saturation or de-saturation of the core. Some are mechanically complex, electrically complex, or both.

The two most practical prior art magnetic switches are the Hall-effect switch and the reed switch, both of which share a common deficiency for organ console use. Most economical Hall switches toggle at less than 100 Gauss field strength. Most reed switches, though somewhat less sensitive, are designed to operate with minimum field strength to conserve power in such applications as relays, and to maximize sensitivity in intrusion detection apparatus. This sensitivity can be a problem in organs consoles where a row of registration controlling stop action magnets, known as SAM's, resides directly above the upper manual. Most SAM's have poorly configured magnetic circuits and leak magnetic flux of hundreds of Gauss at distances of a few inches. SAM's are well-known to leak flux badly enough to interfere magnetically with each other. Employing magnetically sensitive switches in the vicinity of SAM's may invite unwelcome organ noises when organ registration is changed.

OBJECTS OF THE PRESENT INVENTION

Since a single clavier, also known as a manual or keyboard, usually comprises plural keys, and organs usually are fitted two to seven manuals of sixty-one keys, plus a pedal clavier of thirty-two keys, key-stroke detection may become unwieldy, unreliable, and expensive. Some of the aforementioned devices are complex and include costly custom components.

A first object of this invention is to provide a reliable, simple, non-contact sensor comprised of inexpensive, readily available components that can be assembled by standard electronic assembly methods. For example surface mount components can be exceedingly inexpensive and are economically mounted on circuit boards by so-called "pick-and-place" machines. Another object of this invention is to provide a sensor not requiring excitation by an external AC source, incorporating both motion detection and sensor output circuitry, and being easily multiplexed, as is desired in economical modern instruments and MIDI controllers. Yet another object of this invention is to provide a sensor that consumes little power. Yet another object of the present invention is to provide an arrangement of such sensors for keystroke velocity detection. Another object of the present invention is to embody the "second touch" action common in theatre (cinema) organs. A further object of this invention is to provide a sensor for clavier pedals, for clavier pistons, and for stop action magnets. Yet another object of the present invention is to provide a convenient mechanism for adjusting the touch of each position sensor of each key or pedal of a clavier. An important object of this invention to provide a key sensor that is relatively insensitive to stray magnetic fields.

BRIEF SUMMARY OF THE PRESENT INVENTION

This invention may comprise an electronic oscillator having an L-C tank circuit, the latter comprising an inductor having a core, the permeability of which may be modulated by a magnetic field. When subjected to a small magnetic field, the core may have relatively high permeability. The inductance and Q of the inductor, therefore, may be relatively high, along with tank circuit Q, yielding relatively large oscillation amplitude. In the presence of a large magnetic field, core permeability may decrease, causing lower tank circuit Q, and relatively weak oscillation amplitude. Mechanical motion of a magnet, or of a magnetic shunt, may be thus be used to change core permeability to modulate oscillation amplitude responsive to mechanical movement. Oscillation amplitude may be detected to provide a sensor signal responsive to mechanical movement. The amplitude may be interpreted as a switch-ON or switch-OFF state or as a positional value. Since the frequency of oscillation of sensors is also responsive to motion, oscillation frequency may also used to derive a positional output signal according to this invention. Embodiments of this invention may comprise plural sensors arranged in a matrix.

The sensor of this invention may be comprised by clavier keys, clavier pedals, clavier pistons, and stop action magnets. Embodiments of this invention may comprise plural sensors of this invention per clavier key. Embodiments of this invention may also comprise a mechanism for adjusting key touch.

DETAILED DESCRIPTION OF THE DRAWINGS

Figure 1:
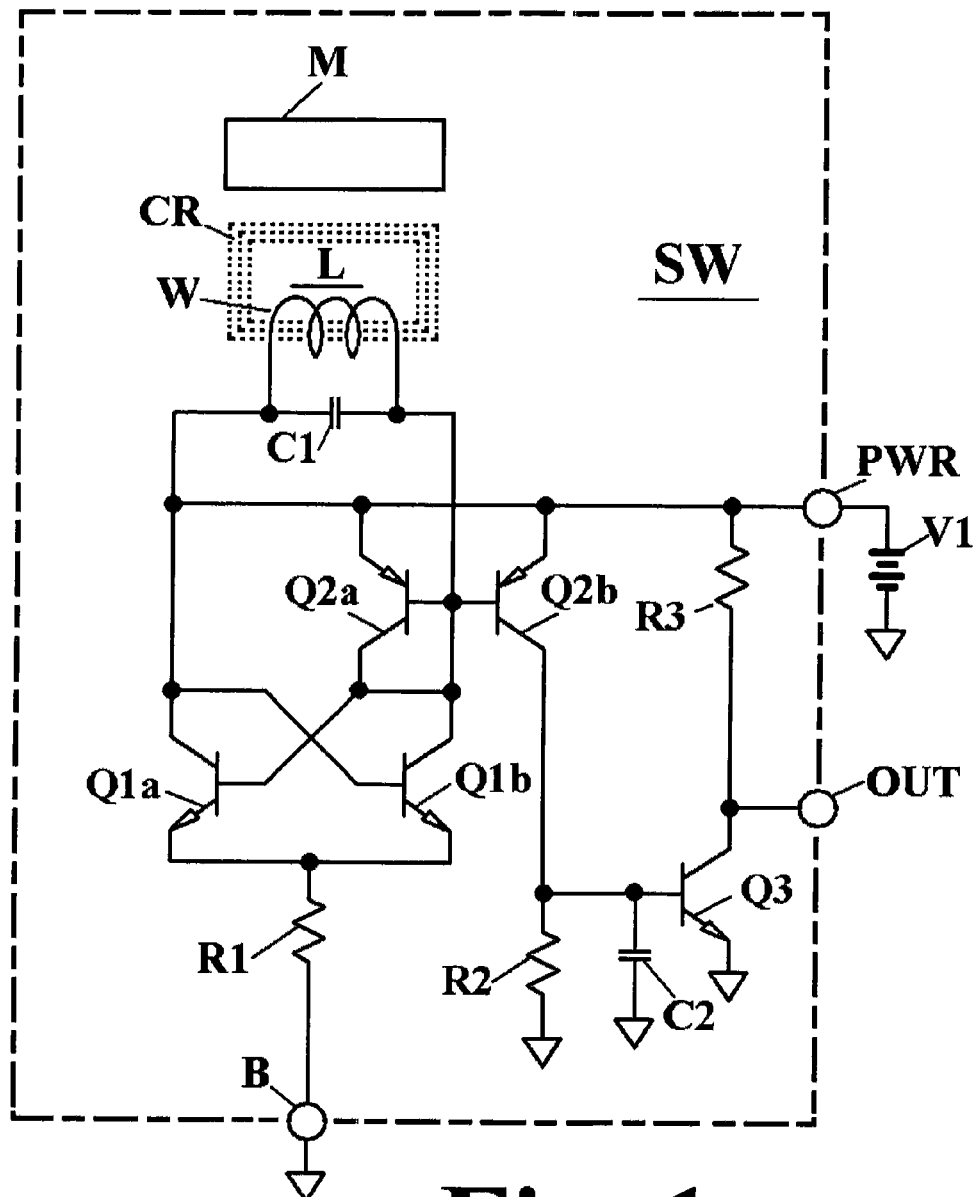
FIG. 1 shows a position sensor according to the present invention.

FIG. 1 is a schematic diagram of a sensor SW according to the present invention. Inductor L is preferably a surface-mount 4.7 uF 0603 size inductor, Vishay type ILSB0603. It should be understood that this inductor is cited to be "magnetically shielded", indicating that it comprises a substantially closed magnetic circuit, depicted in this figure by a core CR. It should be noted that being magnetically shielded, inductor L is but little affected by magnetic fields up to about 3500 Gauss (0.35 Tesla). However, above 3500 Gauss, the magnetic circuit of inductor L saturates causing its inductance to drop substantially and usefully. It should be noted that the approximately 3500 Gauss or more field strength needed to modulate inductor L far exceeds that required to activate a Hall effect switch or a reed switch, giving the sensor of this invention excellent magnetic noise immunity. It should also be understood that inductors not comprising a magnetic core are unsuitable to practice this invention because they lack a magnetically core having a permeability that can be modulated by an external magnetic field; they are not saturable inductors. Inductor L also comprises an conductive "winding" (in this case not actually wound, but deposited), shown here as winding W. It should be understood that the selection of this inductor is based upon low cost and ease of mounting. Many other inductors are usable. A single turn on a ferrite toroid Magnetics Inc. type J40603TC, yielding an inductance of about 2 uH, worked well in one embodiment, but costs more and is not compatible with standard surface-mount assembly techniques.

Shown near inductor L in this figure is a magnet M, preferably a neodymium-iron-boron magnet. Magnet M need not be large, a magnet ¼" in diameter and ¹⁄₁₆" thick sufficing in this embodiment, in which, when a pole of magnet M is within about ⅛" of inductor L, inductance drops greatly.

In shunt with L is a capacitor C1, preferably a 220 pF COG capacitor of 0603 size. L and C1 form an L-C tank circuit resonant at about 4 MHz. Cross-coupled NPN dual transistor Q1a and Q1b, preferably NXP type BC846S, biased by current of about 1.85 mA through resistor R1, preferably 2.7K and of 0603 size, provides the gain necessary for oscillations in L and C1. A PNP dual transistor Q2a and Q2b, preferably NXP type BC856BS, forms a current mirror which from its Q2b collector sources current pulses when strong oscillations exist in the tank circuit, i.e. when the magnet M is distant from inductor L1. These current pulses charge a filter capacitor C2, preferably 220 pF COG capacitor of 0603 size, and supply base current to transistor Q3, preferably NXP type BC846, resulting in increased collector current and providing a relatively low voltage, or even a logic "0", at terminal OUT. When magnet M approaches inductor L1, oscillations weaken, current pulses decrease, resistor R2 discharges capacitor C2, reducing transistor Q3 base and collector currents, allowing R3, preferably 1K and of 0603 size, to pull up terminal OUT to provide higher voltage, or even a logic "1", at terminal OUT. If the sensor SW is to be multiplexed, as described herein below, it may be desirable to omit resistor R3. from sensor SW. Voltage source V1, preferably 5V, and of ordinary character, may be used to power one, or many, sensors SW.

In this preferred embodiment, when magnet M is close to inductor L, the sensor SW weakly oscillates, because magnet M substantially saturates the core CR of inductor L. Saturated, the inductance of L falls from an unsaturated 4.7 uH to below 1 uH. Inductive reactance $Xl=2*pi*F*L$, where F is frequency in Hz and L is inductance in Henries. $Q=Xl/R$ where R represents the losses of the inductor. When the magnet M saturates its core, the inductance of inductor L drops precipitously, but losses do not. Thus the Q of inductor L, and of the tank-circuit comprising it, drop markedly. In this embodiment, such drop of Q suffices to weaken oscillation to effect sensing.

This embodiment functions as a switch when the voltages it provides at terminal OUT drive to known logic states typical and well-known logic circuitry connected thereto. It should also be understood that this invention may be practiced using complementary BJT's, or other active devices such as FET's.

Figure 2B:
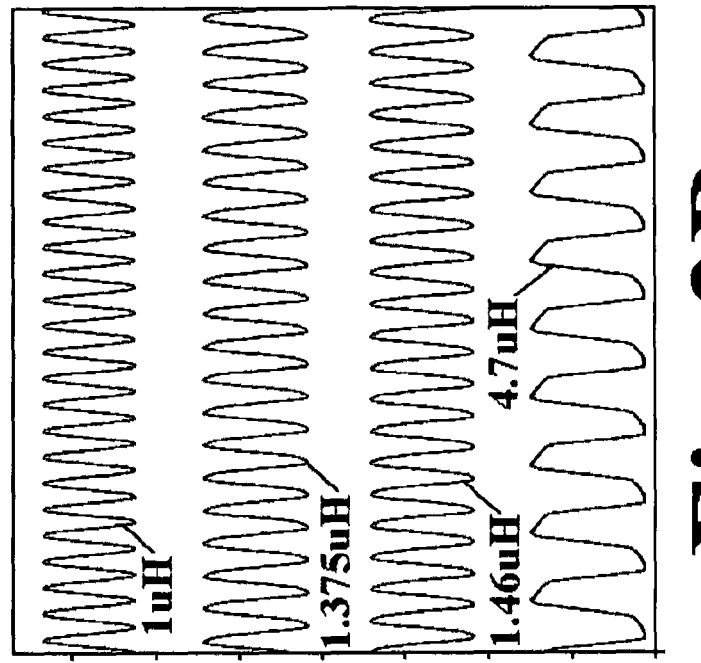
FIG. 2B shows waveforms of sensor of FIG. 1 with a different inductance values.
Figure 2A:
FIG. 2A shows voltage levels and inductance values of the sensor of FIG. 1 with a magnet at different distances therefrom.

FIG. 2A shows terminal OUT waveforms at various inductances of L, representing various distances between inductor L and magnet M. The uppermost and lowermost traces represent the inductances and distances employed for switch operation. The two inner traces show the behavior in a quasi-linear region. Clearly, the large signal response of this embodiment is non-linear.

FIG. 2B shows a 2.5 uS sample of the waveforms seen at the collector of Q1b with the same set of inductances used in FIG. 1. These four waveforms all center on 5V, but have been graphically vertically offset for clarity. The vertical axis ticks on the left are scaled 1V apart, but represent no particular voltages. One might wonder how this set of waveforms can produce such varied outputs. It is important to consider that the transistor Q2a-b current mirror does little until these waveforms attain a peak amplitude of one silicon diode drop, about 600 mV, above which the Q2a-b response is an anti-log function.

Figure 3:
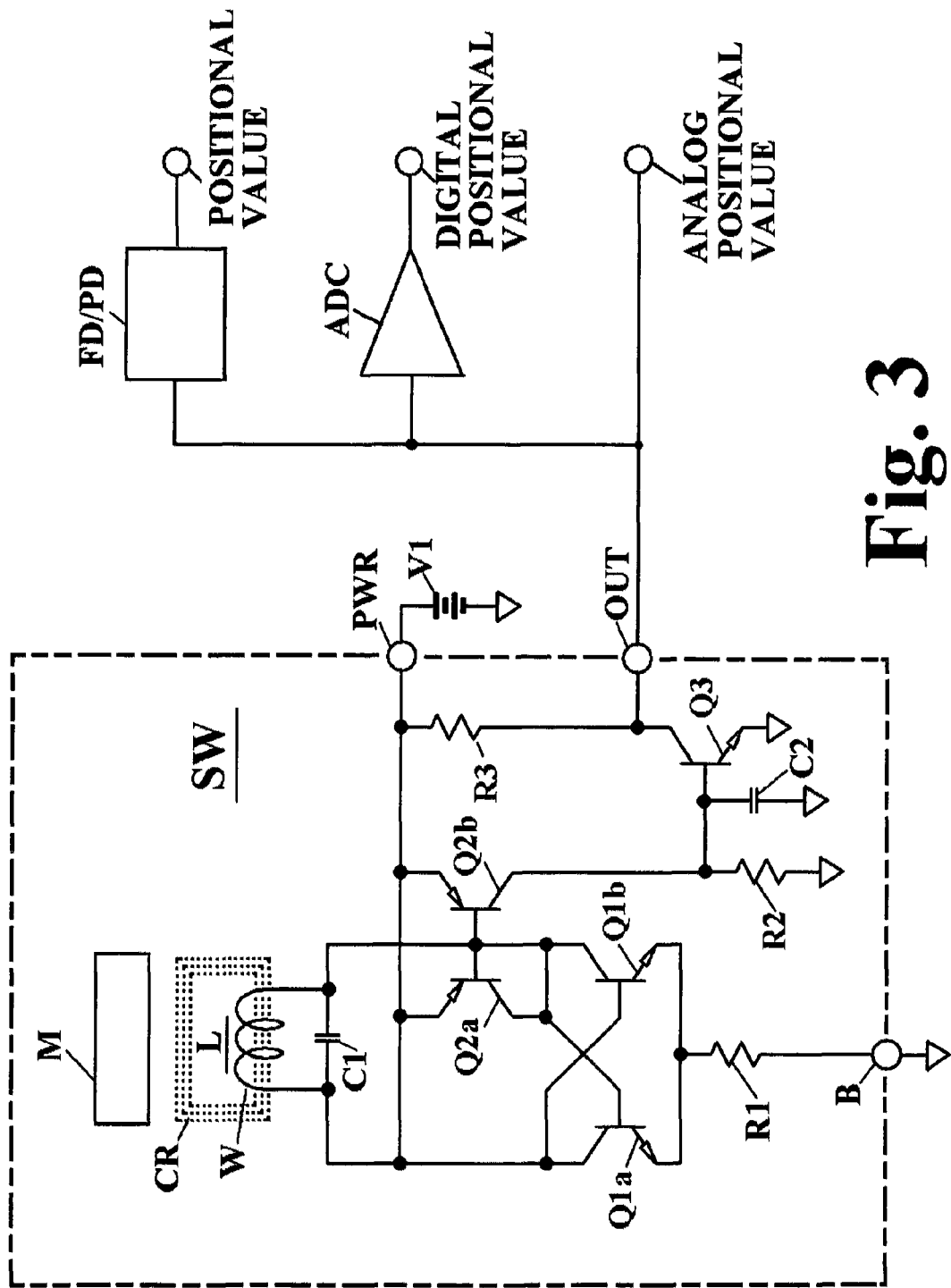
FIG. 3 shows several methods of taking an output from the sensor of FIG. 1.

Examination of FIGS. 2A and 2B shows that a region of quasi-linear relationship exists between movement of magnet M and voltage at terminal OUT. The quasi-linear region is so pronounced that watching terminal OUT voltage on an oscilloscope while exercising a musical instrument key moving magnet M relative to L gives an illusion that the key is somehow mechanically linked to the scope trace. If a well-known analog to digital converter, ADC, be connected to terminal OUT of a sensor SW according to this invention, as is shown with in FIG. 3, the data issuing therefrom is a digital value responsive to key position, which may be used for key velocity sensing, if processed with two thresholds may implement the double touch common on theatre (cinema) organs, or for other purposes. Such linear, rather than switching action is an advantageous attribute of the present invention. Obviously, the analog voltage at terminal OUT, rather than a digital sensor output, may be used to practice this invention, as is also shown in FIG. 3. Alternatively, a well-known frequency detector or period detector may be attached to terminal OUT to process its output ripple, thus providing a sensor output according to this invention. In this latter case, the capacitance of capacitor C2 of sensor SW should be reduced to avoid excessive attenuation of the ripple at terminal OUT.

Figure 4A:
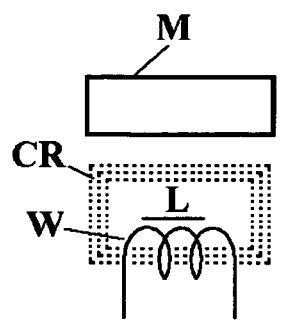
FIG. 4A shows a magnet close to the inductor of a sensor of FIG. 1.
Figure 4B:
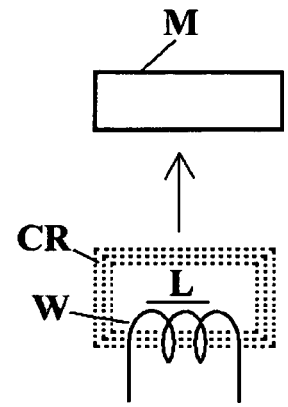
FIG. 4B shows a magnet moved away from the inductor of a sensor of FIG. 1.
Figure 4C:
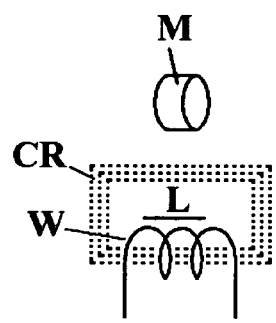
FIG. 4C shows a magnet with its poles longitudinally aligned with the inductor of a sensor of FIG. 1.
Figure 4D:
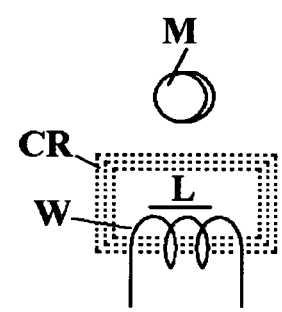
FIG. 4D shows a magnet with its poles at a right angle to the longitudinal axis of the inductor of a sensor of FIG. 1.
Figure 4E:
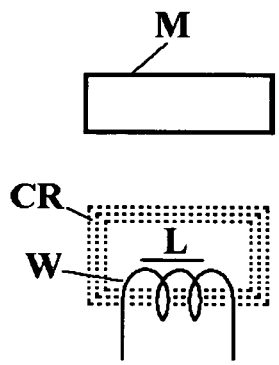
FIG. 4E shows a magnet near the inductor of a sensor of FIG. 1 without an interposed magnetic shunt.
Figure 4F:
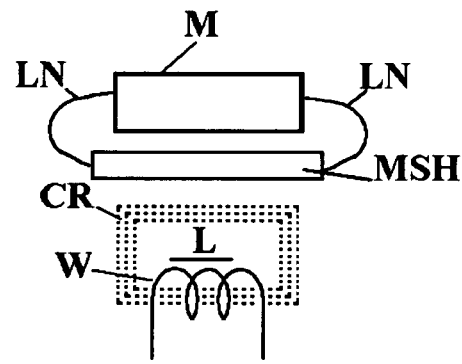
FIG. 4F shows a magnet near the inductor of a sensor of FIG. 1 with an interposed magnetic shunt.

FIGS. 4A, 4B, 4C, 4D, 4E, and 4F depict but a few of the innumerable ways to effect, by mechanical motion, modulation of the magnetic flux linkage between magnet M and inductor L to provide a sensor SW according to the present invention. FIG. 4A shows magnet M relatively close to inductor L, which in such a case will be substantially saturated and sensor SW will but weakly oscillate. In FIG. 4B, on the other hand, magnet M is relatively far from inductor L, which is then substantially un-saturated, allowing vigorous oscillation. FIG. 4C shows disk magnet M relatively close to L as in FIG. 4A. In the preferred embodiment inductor L, being an 0603 part, is not radially symmetrical, and thus is more susceptible to saturation when the poles of magnet M are aligned with its longer axis than when it is rotated 90 degrees therefrom as shown in FIG. 4D. The disc magnet, the poles of which are on its faces, saturates L when its cylindrical axis is aligned with the longitudinal axis of inductor L. When magnet M is rotated 90 degrees, sensor SW oscillates vigorously. FIG. 4E shows magnet M relatively close to L as in FIG. 4A. FIG. 4F shows magnet M and inductor L spaced about the same distance apart, but with a magnetically permeable shunt MSH interposed between them. Instead of passing largely through inductor L, magnetic flux lines LN now pass through shunt MSH. Inductor L thus comes out of saturation, vigorous oscillation ensues, thus sensing of SW occurs. There are numerous and varied arrangements for the magnetic circuit of magnet M and inductor L, and numerous uses for sensor SW. These figures illustrate the fact that physical laws cause in variations of magnetic linkages between object that depend on their relative positions and/or physical proximity. These magnetic linkage variations can modulate the permeability of an inductor with a magnetic core, thus modulating its inductance. Apparatus sensitive to its inductance and then generate an output signal responsive to the relative position or orientation of the magnet and the inductor.

Though this invention is herein below applied as a key switch, preferably for musical instrument keys, it can also be practiced in other uses. For instance, one or more of the sensors SW of FIG. 1 might conveniently be embodied upon a printed circuit board affixed within a brush-less motor. One or more magnets rotating with the armature thereof may thus rotate past each inductor L of each circuit, thus switching the circuit(s) of sensor SW to provide commutation signals for the motor.

Figure 5:
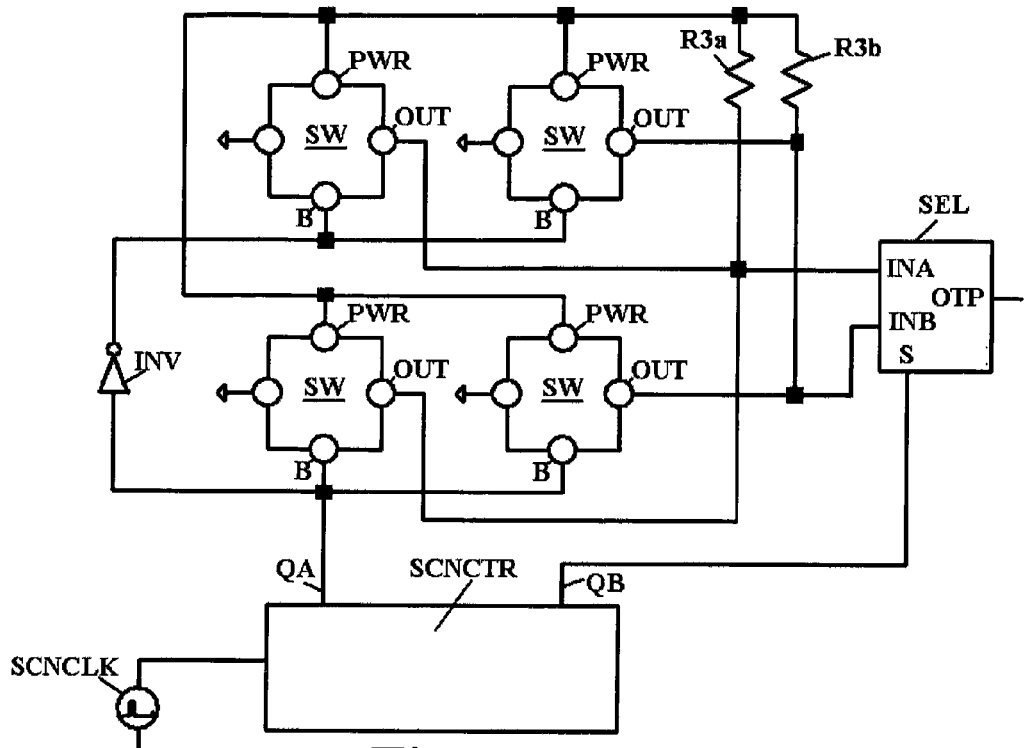
FIG. 5 shows an arrangement for multiplexing sensors according to the present invention.

FIG. 5 shows a 2×2 matrix of four sensors SW according to the present invention. A scan clock SCNCLK drives a 2-bit binary scan counter SCNCTR to produce, at its outputs QA and QB, four unique logical states. An inverter suffices to decode the vertical axis of the matrix. For a larger matrix a more complex decoder would be needed. For example, a matrix of 8 rows might be well served by the ubiquitous 74AC138, the logic-zero outputs of which can easily drive the B terminals of a large number of sensors SW. The column selector SEL for this simple matrix require but a common 74LVC157 1 of 2 selector. This selector has 2 data inputs INA and INB, a select input S, and an output OTP. Many common logic parts will suffice as selectors for larger matrices. The open-collector design of sensor SW facilitates easily forming matrices of plural sensors. All power terminals are powered by a common 5V voltage source that is not here shown. It should be noted that the resistors corresponding to R3 of FIG. 1 now occur outside the individual sensors, shown here as R3A and R3B. It is also important to note that when a sensor of FIG. 1 is selected via its B terminal, it does not start oscillating immediately. There is about 6 uS of latency between selection and valid data, which must be observed to avoid collecting corrupt keystroke data. Such latency is common, though usually much shorter, in such purely digital devices as memories. Is should be noted that a matrix of sensors according to this invention is not limited to switch operation, as ADC's fast enough to respond to sequential analog positional values on a matrix bus line are well-known and readily available.

Figure 6A:
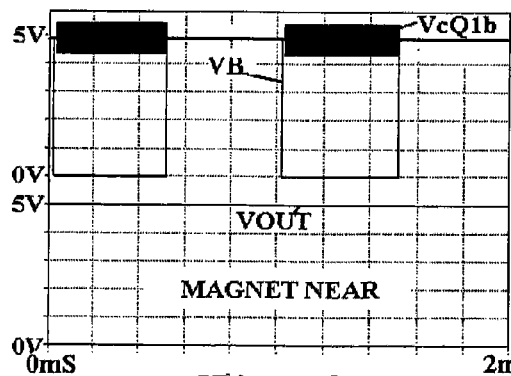
FIG. 6A shows waveforms of a sensors of FIG. 5 with a magnet near its inductor.
Figure 6B:
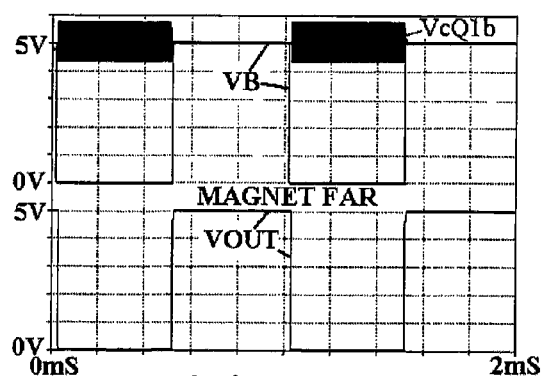
FIG. 6B shows waveforms of a sensors of FIG. 5 with a magnet far from its inductor.

FIG. 6A shows waveforms of a single sensor SW when addressed as part of a matrix such as FIG. 5. The magnet being near inductor L, relatively weak oscillations occur at the collector of Q2b when sensor SW is addressed by 0V on its terminal B. Consequently Q3 remains off, and the terminal OUT remains near 5V during the addressing of sensor SW. FIG. 6B, on the other hand, shows what occurs when sensor SW is addressed through its terminal B with the magnet moved away from inductor L, as would happen if a key were depressed. Oscillation is vigorous during addressing, and VOUT drops to near 0V, responsive to a depressed key. Careful examination of FIG. 6B reveals a slight delay between addressing of sensor SW and its response at its terminal OUT. This delay is the aforementioned latency.

Figure 7:
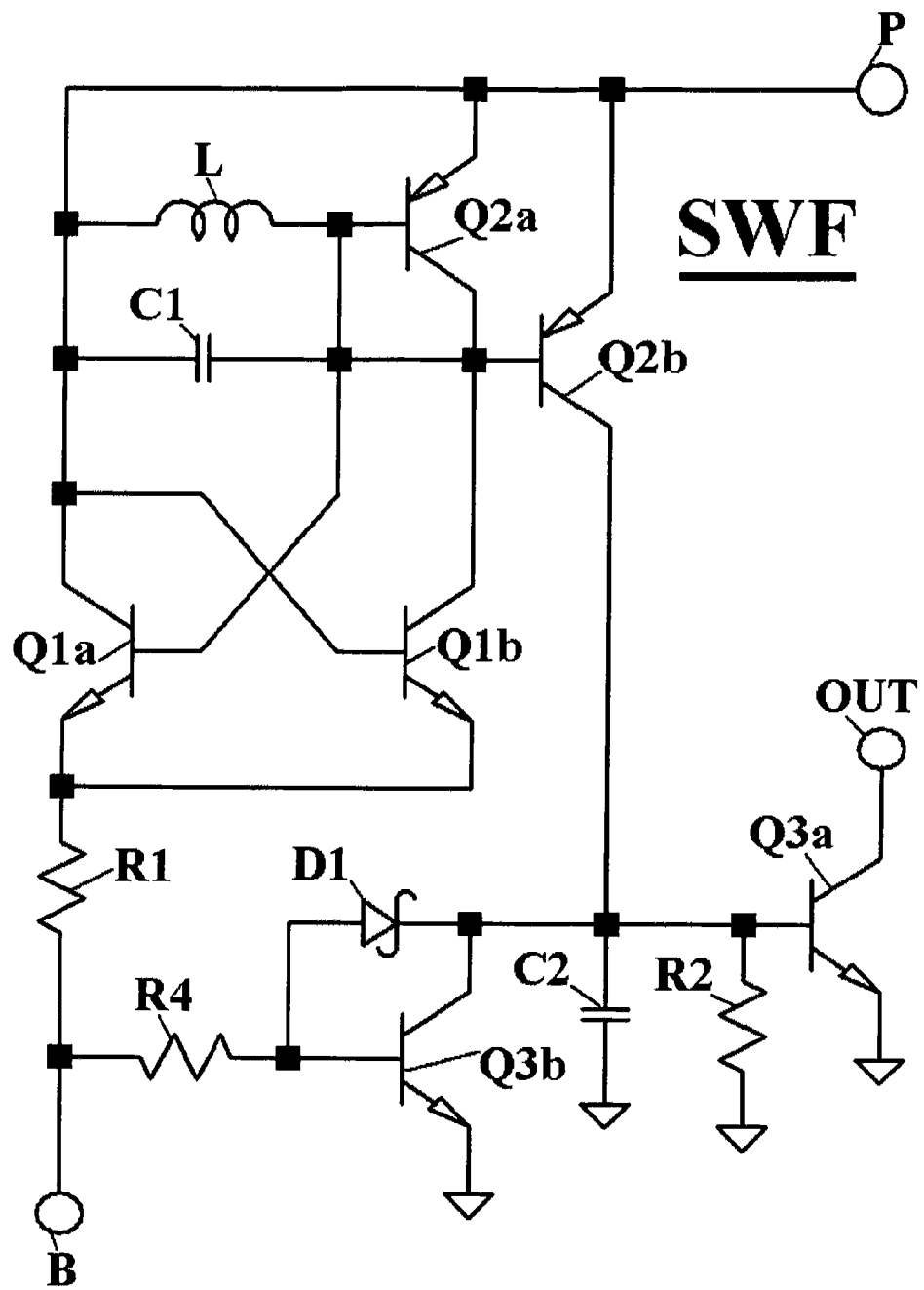
FIG. 7 shows a fast-multiplexing version of the present invention.

FIG. 7 shows an improved sensor SWF according to this invention. Its operation is analogous to that of FIG. 1 regarding the components that it has in common therewith. sensor SWF has, however, three additional components. Q3 of FIG. 1 has become Q3a, half of another dual NPN transistor identical to Q1a,b. The other, Q3b, half of this dual transistor is used quickly to discharge capacitor C2 at the end of the enable period when enable input B rises. R4, preferably 47K and of 0603 size, limits base current in Q3b. Schottky diode D1, preferably NXP type RB751, clamps Q3b to prevent its saturation. When SWF is addressed the delay before valid data becomes available is less than 2 uS. Likewise, when SWF is deselected, Q3a turns off in less than 2 uS quickly leaving un-encumbered any serial data bus to which terminal OUT might be connected. If the operation of sensors SWF is interleaved, as in the FIG. 5 case, one sensor SWF of a matrix can be addressed every 4 uS, yielding a 250 KHz data rate, which far exceeds the needs of musical instrument claviers, even for the most agile of musicians.

Figure 8:
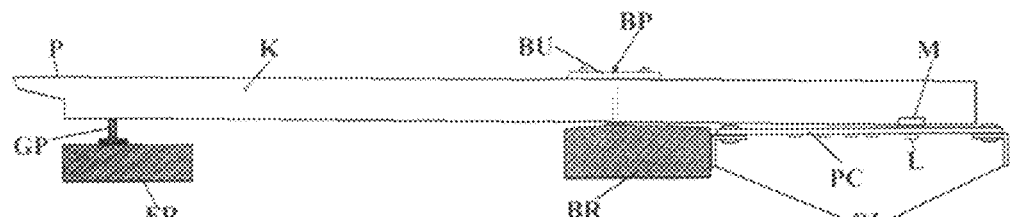
FIG. 8 shows a manual clavier key comprising a sensor according to the present invention.

FIG. 8 shows one key K of a manual clavier which, in conventional fashion, pivots about a balance pin BP, affixed to a balance rail BP. A playing end P of the key K is partly restrained by a guide pin GP, affixed to a front rail FR. An opening penetrating the key K, through which balance pin BP passes, is slotted at its top and fitted with a bushing BU. Thus key K rotates vertically through a small angle when the instrument is played, but is otherwise restrained. It is usual to add a weight or a return spring if the action of the instrument does not otherwise return the key to the rest position shown when the key is released. Also, it is common to apply felt-padded stops to limit the rotation of the key. The mechanism thus far described is traditional in musical manual claviers.

An embodiment of the present invention is also illustrated in FIG. 8. A printed circuit board PC is affixed just below the rear of the key K, in this case by rails RL. On the circuit board PC are mounted an inductor L and other electronic components, one inductor L and associated components corresponding to one sensor SW or SWF per key if single touch is desired. If double touch with switch level operation is desired, two inductors L and associated components corresponding to two sensor SW's or SWF's per key will be fitted on the circuit board PC. Affixed to, or within, the lower surface of the key K is a magnet M, preferably a neodymium rare earth magnet nominally ¼" in diameter by 1/16" inch thick. It is evident that when the playing end P of key K is depressed, magnet M is moved away from inductor L. In this embodiment of this invention the desired sensing action occurs when the magnet M is about ⅛" from inductor L, 1/16" of which distance is the thickness of circuit board PC itself. It should be understood that since a manual has plural keys, that only that portion of the circuit board PC pertaining to a single key has been depicted. It is advantageous to make the circuit board PC to extend under multiple keys, each key having its own magnet (s) M. The arrangement shown here is convenient, but this invention can also be practiced by placing the circuit board PC above a key close to its playing end, with inverted operation below the playing end or above the rear end, or behind a key with the magnet M mounted on its rear. Since surface mount components are minuscule, and circuit boards can be made thin, this invention can also be practiced by mounting the magnet M in the side of a key with circuit board PC occupying the space between keys. This invention may also be practiced with the circuit board PC behind the usual manual cross-bead and a magnet attached below the key.

Figure 9:
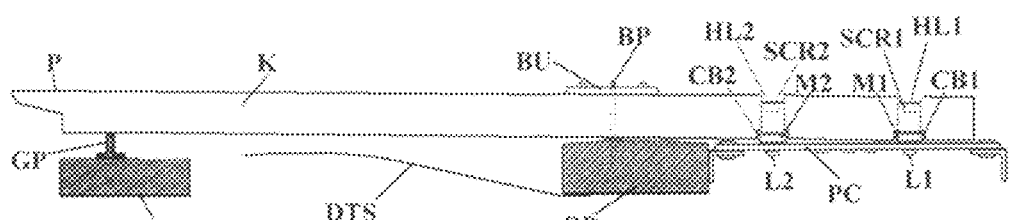
FIG. 9 shows a manual clavier key comprising plural sensors according to the present invention.

FIG. 9 depicts a musical instrument key bearing plural sensors according to the present invention. Instead of being fitted with a single magnet M, the key shown is fitted with two magnets, M1 and M2 and, instead of being associated with a single inductor L, it is associated with two inductors L1 and L2. Each inductor is part of a sensor circuit SW or SWF according to this invention, both of which share the circuit board PC, and may be multiplexed as shown in FIG. 5. This arrangement of this invention may also be practiced with sensors fitted to other parts of the key, as cited above. It is evident from examination that, as the key shown is depressed, magnet M1 will depart from its inductor L1 before magnet M2 departs from inductor L2. Well-known circuitry for detecting a time difference, and well-known algorithms for converting such a time difference to key velocity may be applied to the sensors according to this invention as depicted in this figure to provide a touch-sensitive keyboard.

Alternatively the arrangement in FIG. 9 may be employed to provide a "double-touch" common in theater organs, whereby an initial depression of a key invokes sounds of a first volume and or musical timbre, and further depression activates an additional sound. On double-touch manuals it is customary to fit each key with a well-known double-touch spring DTS, to provide the organist with tactile feedback.

FIG. 9 also depicts touch adjustment mechanisms according to this invention. It is desirable to have all the keys on a manual rest at a common level when not depressed. It is also desirable to have all keys act at a uniform depression, or "touch". Mechanical, and other irregularities, militate against simultaneous achievement of both uniform rest position and uniform touch. Various mechanisms for regulating the resting height of each key are common in the art. When contact-type switches have been fitted to keys, mechanical provision has often been made to adjust the relative position of their contacts to effect uniform touch. The touch adjustment of this invention is simple and inexpensive. Referring to FIG. 9, the key K is penetrated by one or more holes, here HL1 and HL2. Each such hole is provided with a counter-bore, here CB1 and CB2. The counter-bore is chosen to be of perhaps 1/32" larger diameter than its magnet, here M1 and M2. The diameter of the non-counter-bored portion of each hole is preferably chosen to provide an interference fit with the threads of a screw, here SCR1 and SCR2. In a prototype embodiment, a 10-32 hex-head set-screw was threaded into a 5/32 bore in hardwood to provide a tight, thread-locking fit. Each screw is preferably made of a ferrous material. Each magnet is retained in its counter-bore by the magnetic attraction between it and the screw associated with it. Each magnet is preferably a neodymium-iron-boron magnet so that its attraction to the screw so exceeds its weight and inertia that even violent impact cannot dislodge it from its counter-bore. Turning screws SCR1 or SCR2, raises or lowers magnets M1 and M2 respectively relative to L1 and L2, respectively. Thus, the touch of each key sensor of each key can be independently adjusted.

Figure 10A:
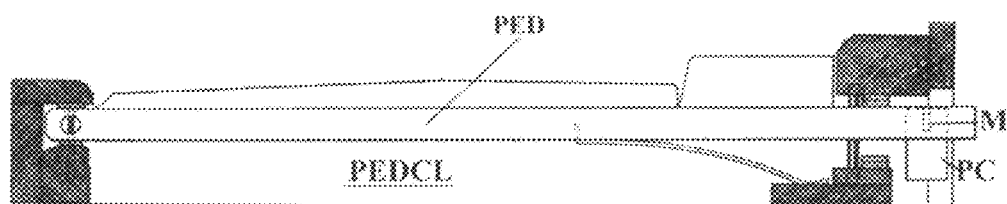
FIG. 10A shows a pedal clavier key comprising a sensor according to the present invention.
Figure 10B:
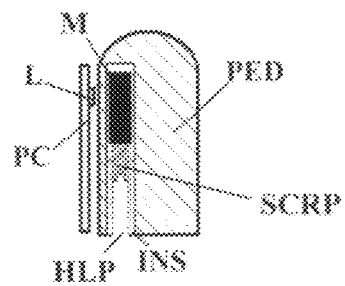
FIG. 10B shows a detail of the application of this sensor to the pedal key.

Manual keyboards, or claviers, are not uniquely afflicted with key switch contact troubles, but pedals of pedal claviers, or pedal-boards, are similarly affected. FIG. 10A shows a section of a typical organ pedal clavier PEDCL, with a single pedal PED being most visible. One placement of a magnet M and a circuit board PC, embodying a sensor according to this invention are also shown. Many other locations upon a pedal may be chosen to practice this invention. FIG. 10B shows the pedal in section with the arrangement of the sensor of the present invention illustrated in more detail. Pedal PED is penetrated by a hole HLP, into which loosely fits a magnet M. Fastened into the same hole by well-known means is a threaded insert INS. Threaded into the insert is a screw SCRP, preferably of a ferrous metal, by which magnet M may be adjusted up or down. In this application, magnet M is preferably a cylinder magnet to accommodate the larger movement of pedals, relative to a manual clavier, so that the touch may be made deeper. Also this magnet may be larger and stronger than a small manual clavier magnet to accommodate the greater distance to the inductor L through the pedal wall. In other respects, the operation of a pedal sensor according to this invention is the same as that of a manual key sensor described above.

Figure 11:
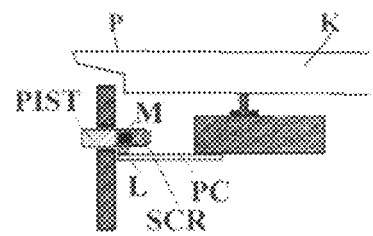
FIG. 11 shows a clavier piston comprising a sensor according to the present invention.

Many organs incorporate, just below their manual claviers, or keyboards, "thumb pistons," for actuating preset combinations of sounds when pressed by the organist's thumb. FIG. 11 depicts such a piston PIST below the playing part P of a key K. The piston of FIG. 11 incorporates a magnet M and adjustment screw SCR that work as described above for the manual and pedal claviers, in conjunction with a circuit board PC comprising an inductor L, all being arranged to embody a key sensor according to the present invention.

On some organs there are as many as, or even more, stop tabs for controls of sounds, than manual keys. It would in most cases be impractical for the organist to manipulate great numbers of these stops as often as required during a performance. Therefore, many organs incorporate a "combination action, in which preset combinations of such stops are electrically activated responsive to the organist having activated an aforementioned piston. When this occurs, the stop is activated or deactivated without being individually manipulated by the organist. To embody this facility, many organs comprise many "stop-action-magnets" also known as SAM's. A SAM shown in FIG. 12 comprises a pair of solenoidal coils. A pulse of current in the lower coil, shown activated, attracts a ferrous armature to turn a stop OFF, as depicted. If the stop must be turned ON, a similar pulse of current is applied to the upper coil to attract the armature up and make the lever, to which is usually attached a decorative external paddle, called a stop tab, descend, centered on pivot PIV. A magnet M is fastened to, and moves with, the armature ARM. Fixed in a central position is a second magnet MR, which is arranged to repel magnet M. Thus, whether manually activated by the aforementioned paddle, or electrically toggled, the SAM seeks stability at the extremes of its motion, being repelled from any intermediate position. In addition to its above cited functions, the SAM must report its status to an organ controller, usually responsive to the closure of a well-known reed switch, not shown, that is usually mounted in the upper right quadrant of the SAM. The SAM as described thus far is common in the prior art.

Figure 12:
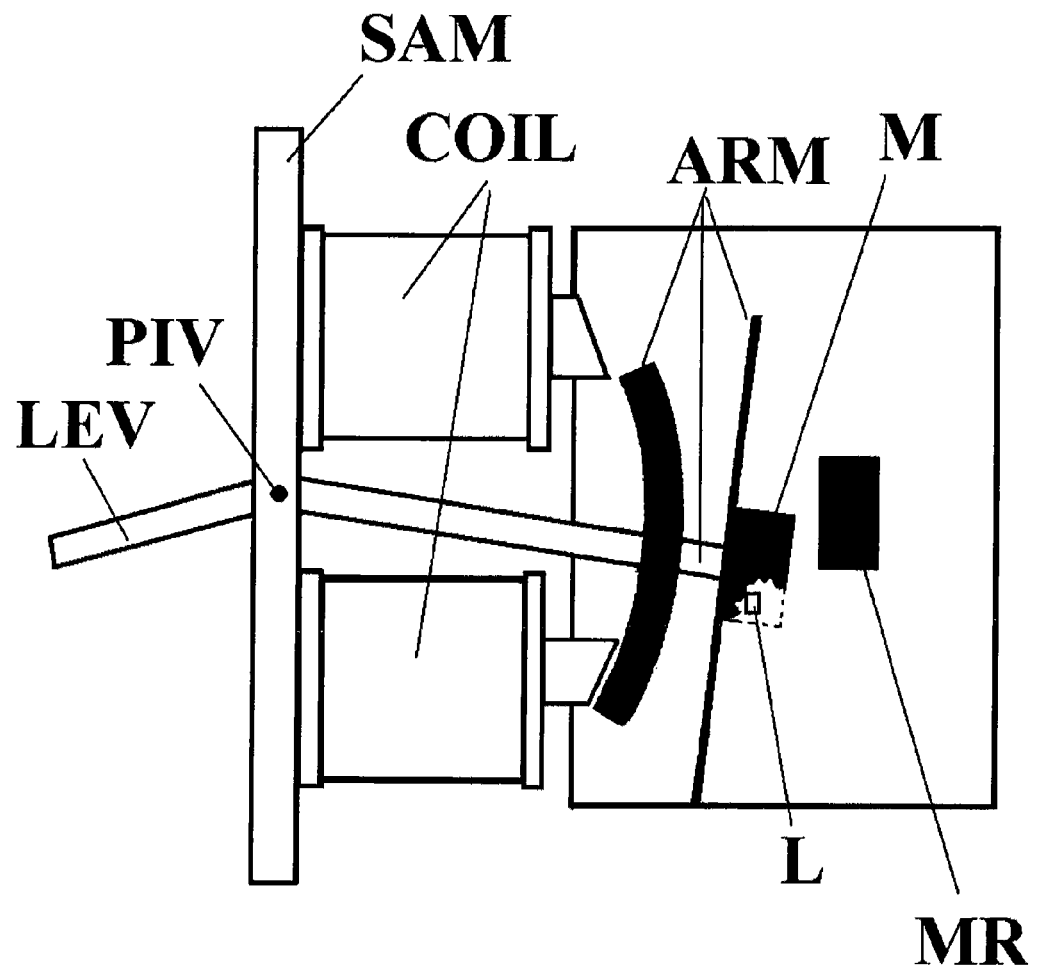
FIG. 12 shows a stop action magnet comprising a sensor according to the present invention.

The SAM of FIG. 12 differs from prior art SAM's in that an inductor L, described above in other embodiments of the present invention, is mounted in proximity to the usual moving magnet M, which also functions as the sensor-magnet M of this invention. The magnet M is here shown cut away to reveal the inductor L which it otherwise conceals. When, via manual or electrical action, the lever LEV is depressed, magnet M moves away from inductor L, causing sensing as described above according to this invention. Since it is customary to mount other SAM components upon a circuit board, inductor L and the components described in FIG. 1 may preferably also be mounted thereupon. When a SAM is fitted with a sensor SW according to this invention, the usual reed switch may be omitted.

Other forms of SAM's comprise draw-knobs that move in a linear manner, and rocker-tabs that rock to activate and deactivate stops. Regardless of the type of SAM to which it is applied, this invention is practiced whenever a oscillatory magnetically activated sensor is applied thereto.

What I claim is:

1. A magnetically-activated position-sensor comprising,
a magnet for generating a magnetic field,
a single L-C tank-circuit comprising a saturable inductor further comprising a magnetically-shielded magnetic circuit capable of saturation responsive to mechanical positional modulation of its magnetic flux linkage with the magnet, whereby its inductance varies responsive to the positional modulation and,
an oscillator comprising the tank-circuit for producing an oscillator signal responsive to the inductance of the saturable inductor whereby,
the amplitude or frequency of the oscillator signal is used to produce a mechanical position responsive output.

2. A brush-less motor comprising an armature mechanically connected to at least one magnet, said magnet being comprised by a magnetically-activated position-sensor according to claim 1, to provide at least one signal responsive to armature position.

3. A stop action magnet comprising an armature mechanically connected to at least one magnet, said magnet being comprised by a magnetically-activated position sensor according to claim 1, to provide at least one signal responsive to armature position.

4. The magnetically-activated position-sensor of claim 1, wherein the magnet is a permanent magnet.

5. The magnetically-activated position-sensor of claim 1, wherein the magnet is an electromagnet.

6. The magnetically-activated position-sensor of claim 1, wherein the sensor is responsive to shunting of the magnetic field by a magnetically permeable object.

7. A manual or pedal clavier key, or a clavier piston comprising:

a magnet for generating a magnetic field, a single L-C tank-circuit comprising a saturable inductor further comprising a magnetically-shielded magnetic circuit capable of saturation responsive to mechanical positional modulation of its magnetic flux linkage with the magnet, whereby its inductance varies responsive to the positional modulation and, an oscillator comprising the tank-circuit for producing an oscillator signal responsive to the inductance of the saturable inductor whereby, the oscillation amplitude or frequency of the oscillator is used to produce a mechanical position responsive output.

8. The manual or pedal clavier key or piston of claim 7, further comprising an adjustment mechanism for controlling the touch of said key, pedal, or piston.

9. The manual or pedal clavier key, or clavier piston of claim 7, comprising plural magnetically-activated position-sensors.

10. The method of position sensing comprising;

modulation of the oscillation amplitude or frequency of an electronic oscillator comprising a single L-C tank-circuit further comprising a saturable inductor further comprising a magnetically-shielded magnetic circuit capable of saturation, controlling flux linkage between the inductor and a magnet responsive to mechanical position and, detecting oscillation amplitude or frequency to generate a sensor output responsive to mechanical position.

* * * * *